United States Patent Office 3,277,082
Patented Oct. 4, 1966

3,277,082
6,7-DIHYDRO-3-(5-NITRO-2-FURYL)IMIDAZO[2,1-b]-1,3,4-THIADIAZINE AND SALTS THEREOF
Louis Edmond Benjamin, Norwich, N.Y., assignor to The Norwich Pharmacal Company, Norwich, N.Y., a corporation of New York
No Drawing. Filed Apr. 9, 1964, Ser. No. 358,656
5 Claims. (Cl. 260—243)

This invention relates to novel nitrofuran compounds. More particularly this invention is concerned with 6,7-dihydro - 3 - (5 - nitro - 2 - furyl)imidazo[2,1 - b] - 1,3,4-thiadiazine which may be represented by the formula:

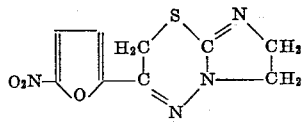

and mineral acid salts thereof which may be represented by the formula:

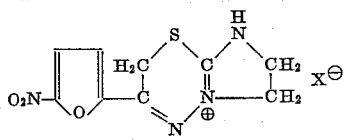

wherein X is an anion, preferably chloride or bromide, as well as methods for the preparation thereof.

The novel compounds of this invention are crystalline solids and the salts are readily soluble in water. They possess noteworthy antimicrobial activity being particularly distinguished by their ability to inhibit the growth of gram-positive and gram-negative organisms such as *Staphylococcus aureus, Escherichia coli, Salmonella typhosa, Streptococcus pyogenes, Streptococcus agalactiae, Erysipelothrix rhusiopathiae* and *Aerobacter aerogenes*. They are thus adapted to be combined as the active toxic constituent in various pharmaceutic forms such as solutions, ointments, pastes, suspensions and dusts for the purpose of eradicating and preventing bacterial growth.

The novel compounds of this invention also possess systemic therapeutic activity being capable, upon peroral administration to mice lethally infected with *Staphylococcus aureus* or *Escherichia coli*, of mitigating the lethal consequences of such infection. Doses of the order of from 100–200 mg./kg. secure such an effect without adverse host response.

The compounds of this invention may be readily prepared. It is presently preferred to prepare a salt such as the bromide by bringing together bromomethyl 5-nitro-2-furyl ketone and 1-amino-2-imidazolidinethione in the presence of a solvent such as ethanol and, advantageously, under the influence of heat to hasten the reaction. When the reaction is completed the desired product, 7,8-dihydro-3 - (5 - nitro - 2 - furyl) - 6H - imidazo[2,1 - b]-1,3,4-thiadiazinium bromide is recover in conventional fashion. This salt may be readily converted to the base by dissolving it in water and netutralizing with a situable quantity of an alkaline agent such as sodium carbonate. The base, 6,7-dihydro - 3 - (5 - nitro - 2 - furyl)imidazo[2,1 - b] - 1,3,4-thiadiazine is readily converted into its chloride salt by dissolving in a suitable solvent such as methanol and adding hydrogen chloride.

In order that this invention may be readily available to and understood by those skilled in the art, the following illustrative but not limitative examples are supplied.

EXAMPLE I (NF–1035)

*6,7-dihydro-3-(5-nitro-2-furyl)imidazo[2,1-b]-1,3,4-thiadiazine*

A. *Preparation of 7,8-dihydro-3-(5-nitro-2-furyl)-6H-imidazo[2,1-b]-1,3,4-thiadiazinium bromide.*—A mixture of bomomethyl 5-nitro-2-furyl ketone (46.8 g., 0.2 mole) and 1-amino-2-imidazolidinethione (23.4 g., 0.2 mole) in ethanol (225 ml.) is heated at reflux for 15 mins. Complete solution occurs and then a yellow solid separates. The mixture is cooled and filtered to yield 63 g. (95%) of product which decomposes above 235° without melting.

B. *Preparation of 6,7-dihydro-3-(5-nitro-2-furyl)imidazo[2,1 - b] - 1,3,4 - thiadiazine.*—7,8 - dihydro - 3 - (5-nitro-2-furyl)-6H-imidazo[2,1-b]-1,3,4-thiadiazinium bromide (60 g., 0.18 mole) is dissolved in hot water (600 ml.). The hot solution is treated with charcoal and filtered hot. The filtrate is cooled to ca. 70° and made basic with an aqueous solution of sodium carbonate. After cooling in an ice bath, the brownish-orange solid is collected by filtration, washed with water, and dried at 100°. An initial yield of 41 g. (91%) of title product melting at ca. 165° is obtained. This is heated in refluxing methanol (800 ml.) for 1 hr. After cooling the mixture is filtered to yield 35 g. of brownish-orange crystals, M.P. 173–174°.

*Analysis.*—Calcd. for $C_9H_8N_4O_3S$: C, 42.85; H, 3.20; N, 22.21. Found: C, 42.91; H, 3.45; N, 22.25.

EXAMPLE II (NF–1034)

*7,8-dihydro-3-(5-nitro-2-furyl)-6H-imidazo[2,1-b]-1,3,4-thiadiazinium chloride*

The compound of Example IB (28 g., 0.11 mole) is dissolved in methanol (1800 ml.). The hot solution is treated with charcoal and filtered. Dry hydrogen chloride is passed into the solution until the solution is strongly acidic. The title product separates from solution as a yellow solid after the solution has been diluted with ether (600 ml.) and cooled in an ice bath for several hours. A yield of 29 g. (88%) is obtained. It darkens without melting when heated above 235°.

*Analysis.*—Calcd. for $C_9H_9ClN_4O_3S$: C, 37.44; H, 3.14; Cl, 12.28; S, 11.12. Found: C, 37.64; H, 3.05; Cl. 12.07; S, 11.10.

What is claimed is:
1. A member of the group consisting of a compound of the formula:

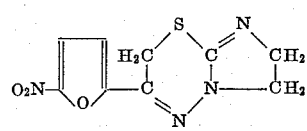

and a mineral acid salt thereof.
2. 7,8 - dihydro - 3 - (5 - nitro - 2 - furyl) - 6H - imidazo[2,1-b]-1,3,4-thiadiazinium bromide.
3. 7,8 - dihydro - 3 - (5 - nitro - 2 - furyl) - 6H - imidazo[2,1-b]-1,3,4-thiadiazinium chloride.
4. 6,7 - dihydro - 3 - (5 - nitro - 2 - furyl)imidazo[2,1-b]-1,3,4-thiadiazine.
5. A method for preparing a compound of the formula:

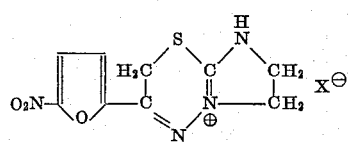

wherein X represents a member of the group consisting of chloro and bromo which comprises bringing together a halomethyl 5-nitro-2-furyl ketone and 1-amino-2-imidazolidinethione in the presence of an inert solvent.

No references cited.

WALTER A. MODANCE, *Primary Examiner.*
JOHN M. FORD, *Assistant Examiner.*